United States Patent [19]
Arnold et al.

[11] Patent Number: 5,329,753
[45] Date of Patent: Jul. 19, 1994

[54] CORN HARVESTING IMPLEMENT FOR FIELD CHOPPING MACHINE

[75] Inventors: Rudolf Arnold; Wilfried Schulz, both of Saulgau, Fed. Rep. of Germany

[73] Assignee: Claas Saulgau GmbH, Saulgau, Fed. Rep. of Germany

[21] Appl. No.: 940,454

[22] Filed: Sep. 4, 1992

[30] Foreign Application Priority Data

Sep. 21, 1991 [DE] Fed. Rep. of Germany ....... 4131491

[51] Int. Cl.$^5$ ............................................. A01D 45/02
[52] U.S. Cl. ......................................... 56/98; 56/119; 56/228
[58] Field of Search ............................ 56/228, 119, 98

[56] References Cited

U.S. PATENT DOCUMENTS

| | | | |
|---|---|---|---|
| 2,224,970 | 12/1940 | Lindgren et al. | 56/228 |
| 3,345,808 | 10/1967 | Van Der Lely | 56/228 |
| 4,009,557 | 3/1977 | Reicks | 56/98 |
| 4,084,396 | 4/1978 | Fritz et al. | 56/98 |
| 4,086,749 | 5/1978 | Greiner et al. | 56/98 |
| 4,227,366 | 10/1980 | Pucher | 56/98 X |
| 4,244,162 | 1/1981 | Pucher | 56/14.2 |
| 4,333,304 | 6/1982 | Greiner et al. | 56/98 X |
| 4,409,780 | 10/1983 | Beougher et al. | 56/228 |
| 4,418,517 | 12/1983 | Ehrhart et al. | 56/228 |
| 4,441,305 | 4/1984 | Lippl | 56/228 X |
| 4,543,774 | 10/1985 | Arnold | 56/98 |
| 4,567,717 | 2/1986 | Manton | 56/98 X |
| 4,633,657 | 1/1987 | Arnold | 56/228 X |
| 4,739,608 | 4/1988 | Arnold | 56/98 |
| 4,813,217 | 3/1989 | Arnold | 56/228 |

FOREIGN PATENT DOCUMENTS

| | | |
|---|---|---|
| 7118507 | 12/1971 | Fed. Rep. of Germany . |
| 1582361 | 4/1974 | Fed. Rep. of Germany .......... 56/98 |
| 3233122 | 8/1984 | Fed. Rep. of Germany . |
| 8534520 | 3/1986 | Fed. Rep. of Germany . |
| 2337988 | 8/1977 | France ...................................... 56/98 |

Primary Examiner—Mark Rosenbaum
Assistant Examiner—Frances Han
Attorney, Agent, or Firm—Michael J. Striker

[57] ABSTRACT

A corn harvesting implement for a field chopping machine has a drawing-in trough, a plurality of transporting passages supported on the drawing-in trough, the transporting passages including at least two outer transporting passages which are foldable upwardly to a transporting position for obtaining a smaller transporting width and foldable outwardly to a working position. The transporting passages also include stationary transporting passages. The transporting passages are arranged so that in the working position a predetermined distance is provided between at a part of at least one of the upwardly foldable transporting passages and at least a part of a neighboring part of the stationary transporting passages. Means for increasing the distance at least before a beginning of folding the upwardly foldable passages from the working position to the transporting position is provided.

19 Claims, 5 Drawing Sheets

CORN HARVESTING IMPLEMENT FOR FIELD CHOPPING MACHINE

BACKGROUND OF THE INVENTION

The present invention relates to a corn harvesting implement for a field chopping machine.

More particularly, it relates to a corn harvesting implement which has a plurality of transporting passages supported on a drawing-in trough which carries a transverse conveyor transporting screw, and at least two outer transporting passages are upwardly foldable for forming a smaller transportation width.

Corn harvesting implements of the above mentioned general type are known in the art. One of such corn harvesting implements is disclosed, for example, in the German patent 3,233,122. Since the width of the drawing-in trough is determined from above by the maximum transportation width prescribed in accordance with the law, in the corn harvesting implements with 8 transporting passages or with 6 transporting passages for great row distances, a considerable spreading of the outer transporting passages is produced. With a great spreading it is however impossible, due to structural and spatial reasons to fold upwardly the outer transporting passages in the above described manner since the structural elements of the not upwardly foldable transporting passages and of the upwardly foldable transporting passages collide with one another.

SUMMARY OF THE INVENTION

Accordingly, it is an object of the present invention to provide a corn harvesting implement for a field chopping machine, which avoids the disadvantages of the prior art.

More particularly, it is an object of the present invention to provide a corn harvesting implement for a field chopping machine, in which widely spread transporting passages can be folded upwardly for street transportation.

In keeping with these objects and with others which will become apparent hereinafter, one feature of the present invention resides, briefly stated, in a corn harvesting implement in which a distance between a upwardly foldable transporting passage and a neighboring not upwardly foldable transporting passage, or between parts of a upwardly foldable transporting passage and parts of a neighboring not upwardly foldable transporting passage in the working position can be increased before the beginning or during the folding upwardly.

It is especially advantageous when the upwardly foldable transporting passage or passages or the parts of the upwardly foldable transporting passages and in some cases the transporting passages which are turnable with them, can be displaced outwardly and forwardly before or during the upward folding relative to the not upwardly foldable transporting passages or to the parts of the neighboring stationary transporting passages.

In accordance with another feature of the present invention, the upwardly foldable transporting passage or passages or the parts of the upwardly foldable transporting passage and in some cases the transporting passages turnable with them, are supported on auxiliary frames which are connected with the drawing-in trough through a carriage guide which is inclined relative to the travelling direction.

In accordance with still another feature of the present invention the upwardly foldable transporting passage or passages or the parts of the upwardly foldable transporting passages and in some cases with the transporting passages turnable with it, are supported on auxiliary frames which in turn are turnably connected with the drawing-in trough through hinge rectangles or the like.

Also, the upwardly foldable transporting passage or passages or parts of the upwardly foldable transporting passage and in some cases with the transporting passage turnable with it are carried by auxiliary frames which are turnable about turning axle relative to a carriage guide or to the hinge rectangle.

An especially reliable construction and simple handling are obtained when the auxiliary frames during turning from the working position to the transporting position and during reverse turning to the working position are automatically unlocked or locked relative to a structural part of the drawing-in trough.

Also, the displacement of the auxiliary frame relative to the drawing-in trough and the turning of the auxiliary frame to the transporting position or to the working position can be actuated by a hydraulic control member.

In a modification of the corn harvesting device disclosed in the German patent 3,233,122, the corn harvesting device in accordance with the present invention can have several transporting passages located near one another, supported on a drawing-in trough which carries a transverse transporting screw, and including outer transporting passages which are foldable upwardly to obtain a smaller transporting width, wherein in accordance with the present invention more than six transporting passages are provided, and at least two outer transporting passages on an end side of the drawing-in trough are upwardly turnable about an axis and fixable.

This construction is a further modification of the construction disclosed in the German patent 3,233,122. In the German patent there are six transporting passages and each outer transporting passage is upwardly foldable for a straight transportation. In the present invention as defined in this paragraph a device with a greater working width is provided than in the prior art and at the same time it is bringable in a simple manner to a transporting position in which the observation of the driver of the street is not hindered. For this purpose more than six transporting passages are provided, and at least at one end side of the drawing-in trough two outer transporting passages are turnable upwardly about an axis and fixable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
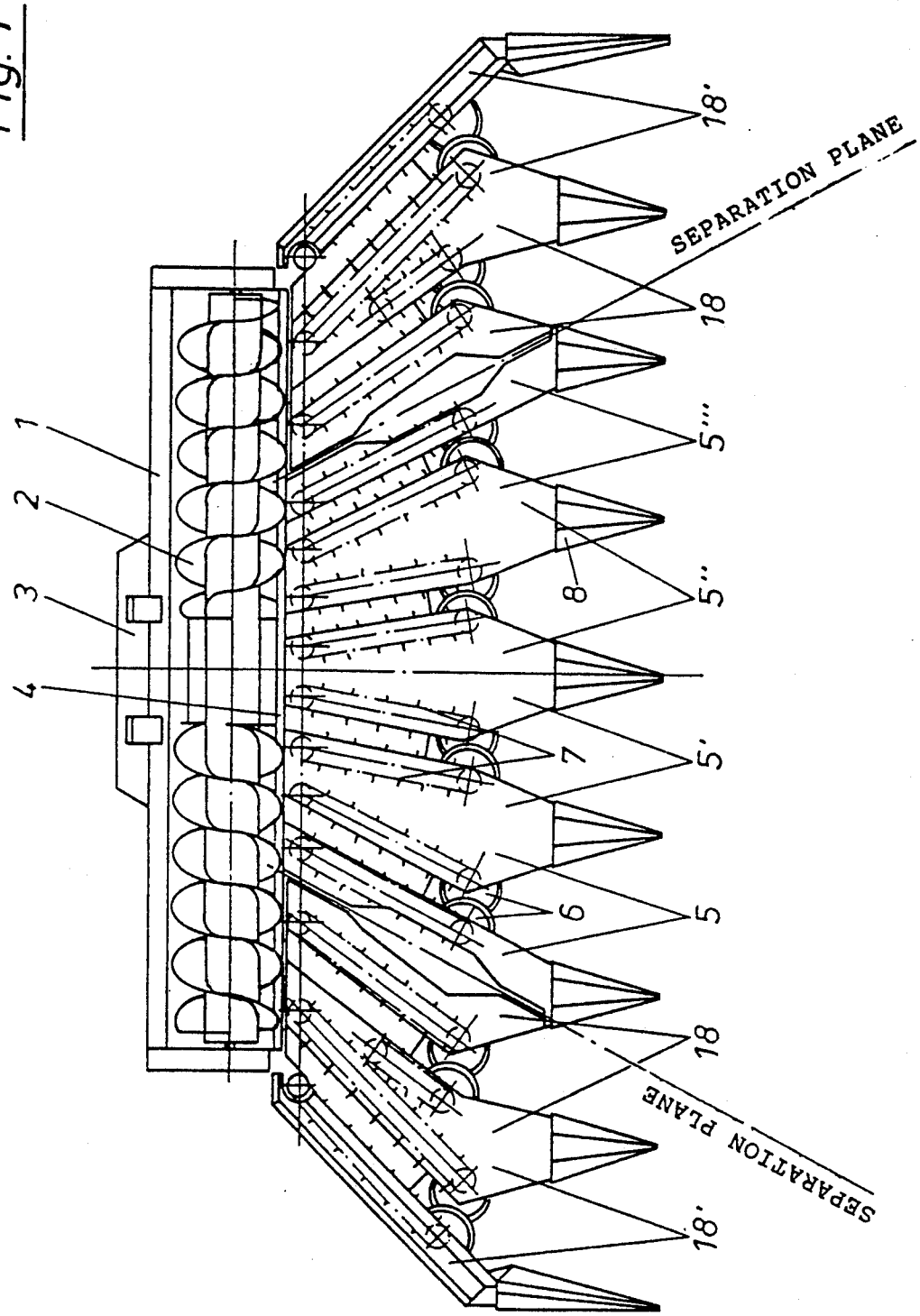
FIG. 1 is a plan view showing an 8-row corn harvesting implement in a working position.

A grain harvesting implement in accordance with the present invention for mounting on a not shown field chopping machine has a drawing-in trough 1 which serves as a supporting element and is provided with a transverse transporting screw 2. It supplies the harvested product which is cut from the ground and transported into the trough, to a shaft which is identified with reference numeral 3. The drawing-in trough has frame beams 4, which are located at the front as considered in a traveling direction. Four transporting passages 5, 5', 5'', 5''' are fixedly mounted on the frame beams 4. Each transporting passage includes substantially a rotating cutter 6, transporting chains 7 arranged in a pair, and separating plates 8.

Figure 6:
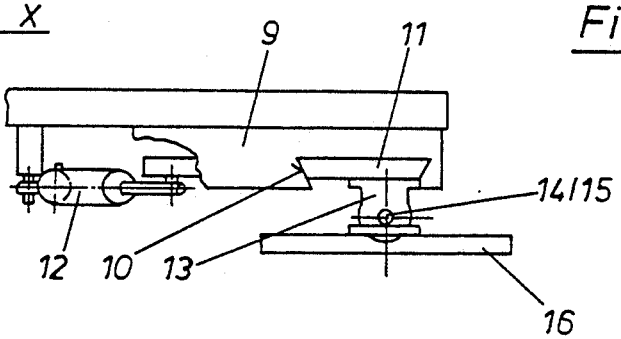
FIG. 6 is a partial section substantially corresponding to the FIG. 5, in direction of the arrow X.
Figure 5:
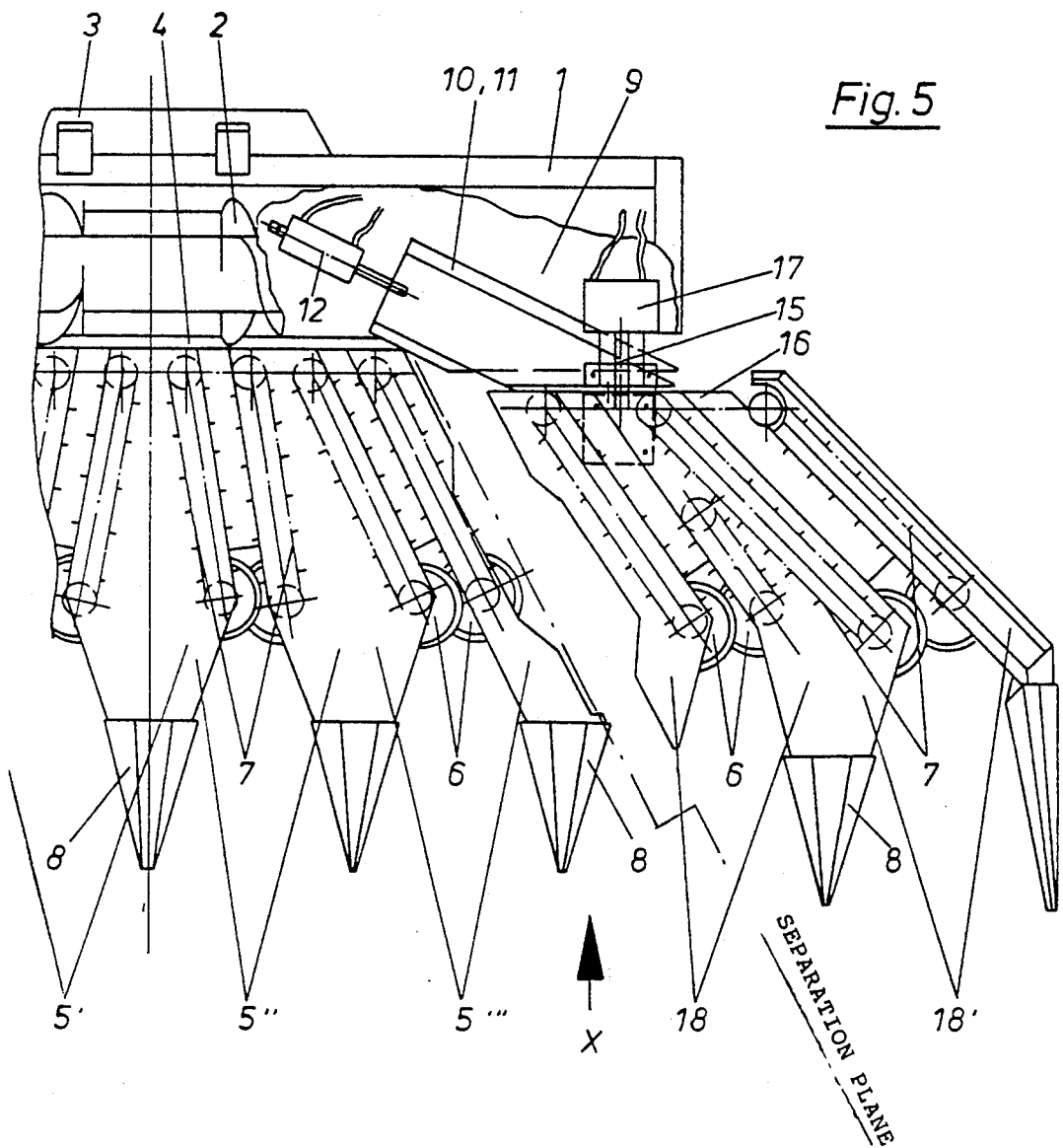
FIG. 5 is a view substantially corresponding to the view of FIG. 2, but showing a section on a somewhat enlarged scale.

The drawing-in trough has a fixed frame part 9 which is shown in FIGS. 5 and 6 and provided near its end with a guiding groove 10. The guiding groove is inclined relative to the travelling direction. A carriage 11 is longitudinally displaceably supported in the guiding groove 10. The carriage 11 can move longitudinally in the guiding groove 10 by a hydraulic cylinder-piston unit 12. A bearing head 13 is located on the free end of the carriage 11 at its lower side and has an opening extending in a travelling direction. A pin 15 is turnably supported in the opening 14 and fixedly connected with an auxiliary frame 16. The pin 15 can be turned by a hydraulic stepper motor 17 together with the auxiliary frame 16. Two transporting passages 18 and 18' are fixedly mounted on the auxiliary frame 16. They are designed similarly as the fixedly mounted transporting passages 5, 5', 5'', 5'''.

As explained hereinabove the auxiliary frame 16 is turnably supported on the guiding groove 10, 11 carriage structure. Instead it can be also turnably supported on paralellogram linkage 19 or a similar structure. This last mentioned option is shown in FIG. 2 at the left side.

In the working position all transporting passages 5, 5', 5'', 5''', 18, 18' are located in a row near one another as shown in FIG. 1. The carriage guides 10, 11 move together so far that the frame beams 4 and the auxiliary frames 16 are in alignment with one another. In this position the transporting passages 5, 5', 5'', 5''', 18, 18' can take corn in each row and harvest it.

Figure 2:
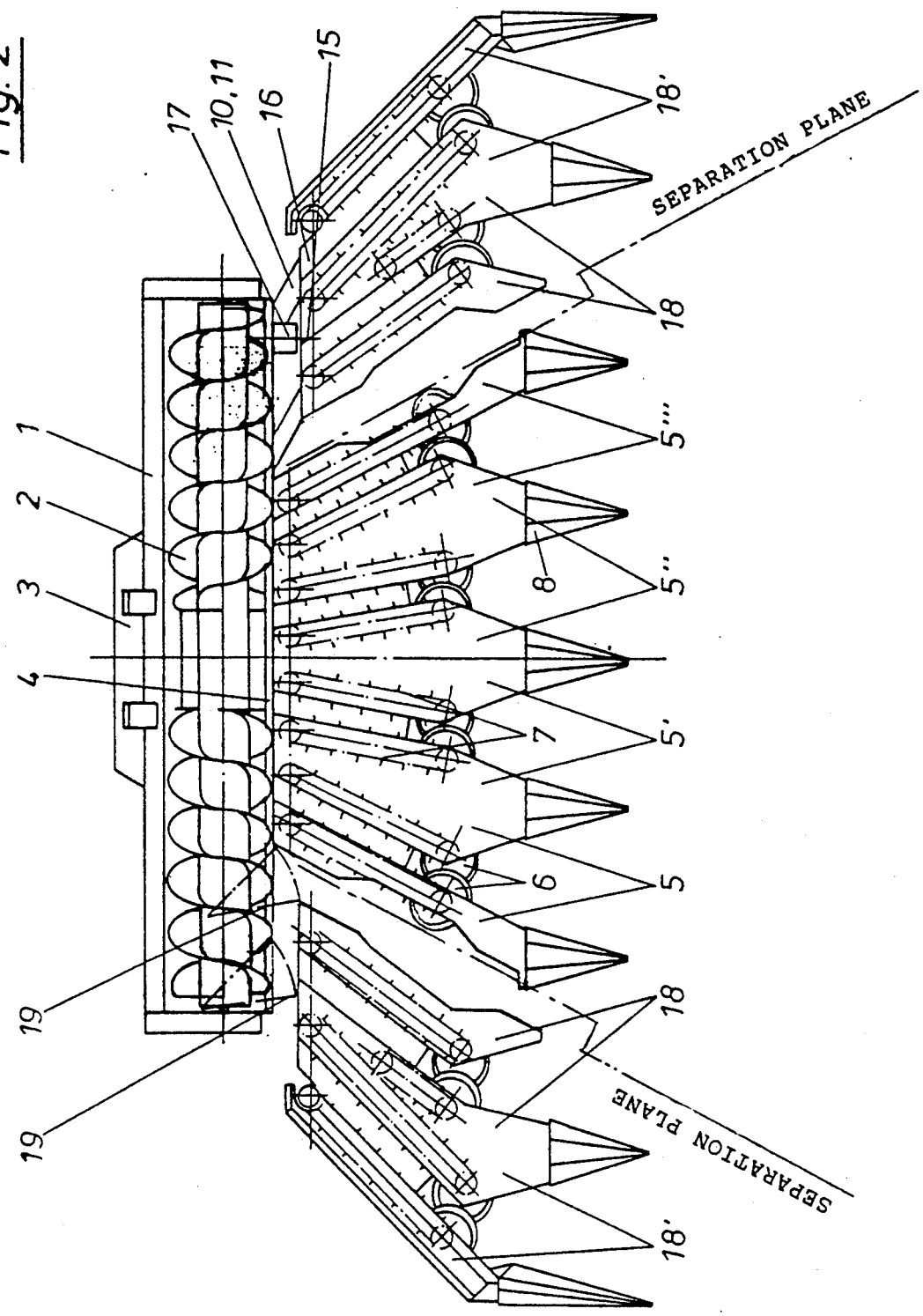
FIG. 2 is a view showing the same implement in an intermediate position between a working position and a transporting position.

In order to bring the outer transporting passages 18, 18' into the transporting position, the carriage 11 is displaced by the stroke cylinder-piston unit 12 so far outwardly and forwardly that an auxiliary frame 16 and with it the transporting passages 18, 18' assume a position as shown in FIGS. 2 and 5. A significant distance therefore is formed between a stationary transporting passage 5 or 5''' and a folding transporting passage 18.

Figure 3:
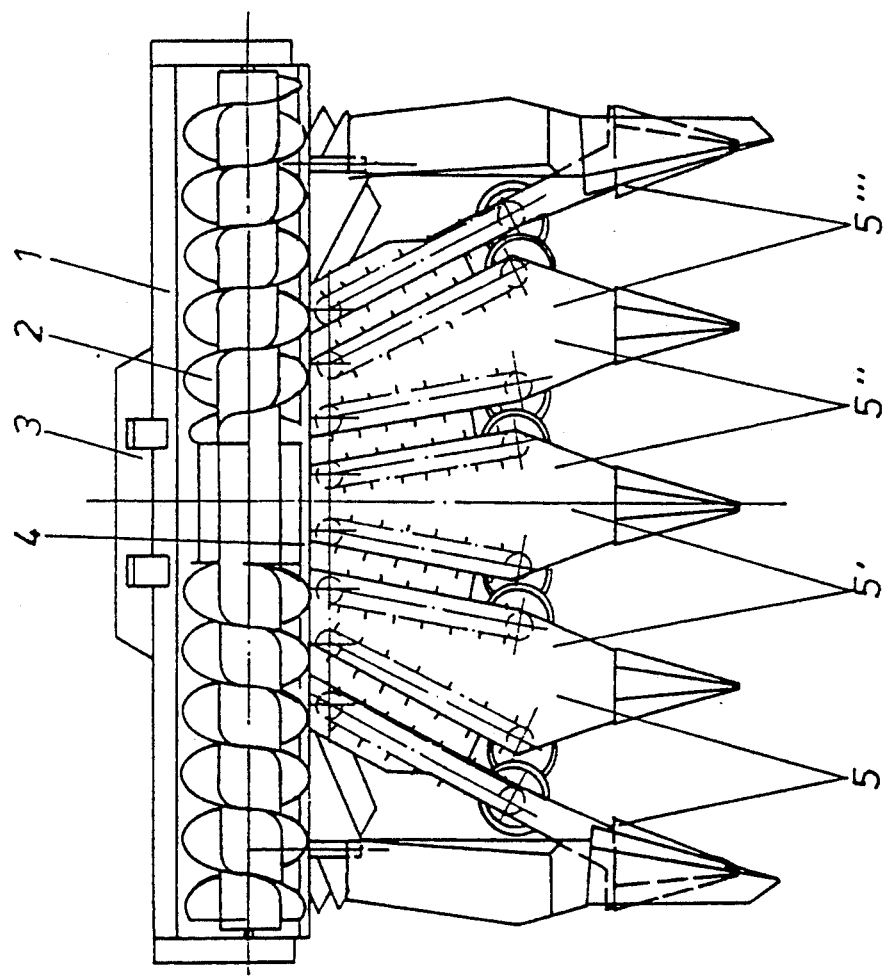
FIG. 3 is a view showing the same implement in accordance with the present invention in a transporting position.
Figure 4:
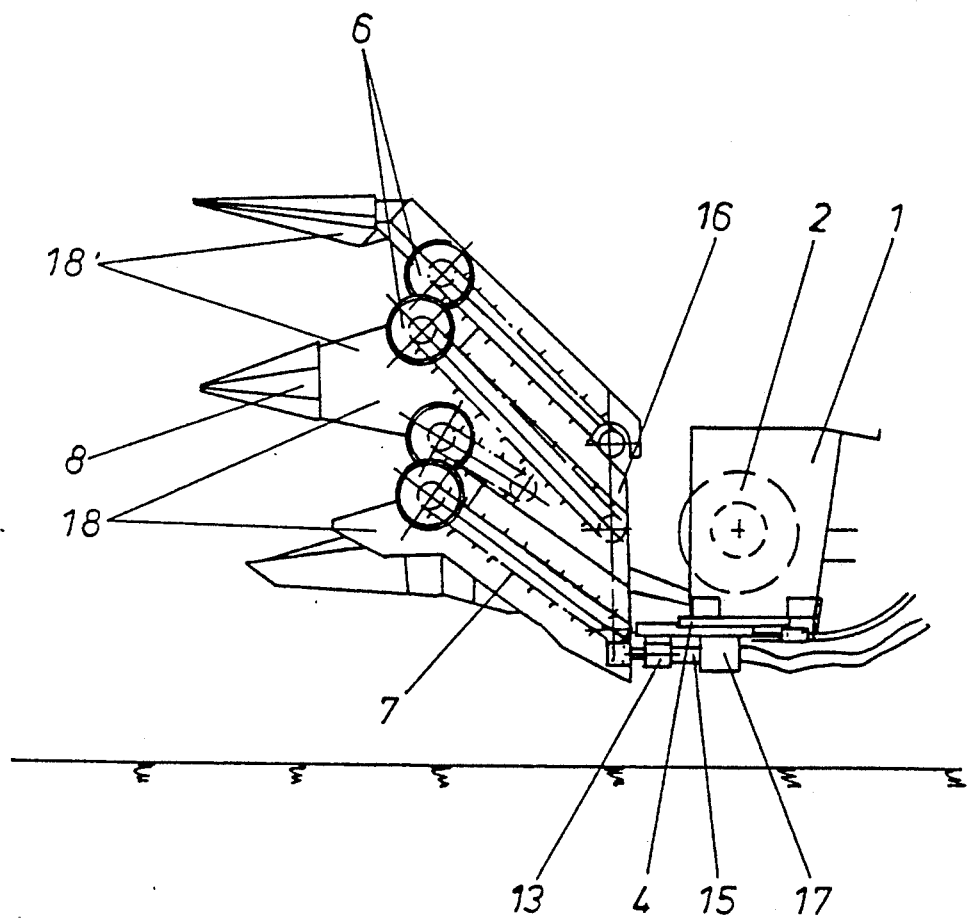
FIG. 4 is a view substantially corresponding to the view of FIG. 3 but showing the implement from a side.

This allows to turn the auxiliary frame 16 together with the transporting passages 18, 18' mounted on it by means of the stepper motor 17 so far that they assume a substantially vertical position as shown in FIGS. 3 and 4. The transporting width of the implement in this position is not greater than the width of the drawing-in trough 1.

During moving the outer transporting passages 18, 18' to the working position, a reverse process is performed. Care should be taken that in the end position the auxiliary frame 16 is locked by known and not shown means with a structural part of the drawing-in trough 7.

The drive of the rotating cutter 6 and the transporting chains 7 in the transporting passages 5, 5', 5'', 5''', 18, 18' as well as the separation and coupling of the drive for the outwardly turnable transporting passages 18, 18' can be performed in the same manner as for example in the German patent 3,233,122.

It will be understood that each of the elements described above, or two or more together, may also find a useful application in other types of constructions differing from the types described above.

While the invention has been illustrated and described as embodied in a corn harvesting implement for field chopping machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A corn harvesting implement for a field chopping machine, comprising a drawing-in trough; a plurality of transporting passages supported on said drawing-in trough, said transporting passages including at least two outer transporting passages which are foldable upwardly to a transporting position for obtaining a smaller transporting width and foldable downwardly to a working position, said transporting passages also including stationary transporting passages, at least one of said upwardly foldable transporting passages and a neighboring one of said stationary transporting passages being arranged so that in said working position a predetermined distance is provided between at least a part of said at least one of said upwardly foldable transporting passages and at least a part of said neighboring one of said stationary transporting passages; and means for increasing said distance at least before a beginning of folding of said upwardly foldable passages from said working position to said transporting position.

2. A corn harvesting implement as defined in claim 1; and further comprising a transverse transporting screw supported on said drawing-in trough.

3. A corn harvesting implement as defined in claim 1, wherein said distance is provided between said one upwardly foldable transporting passage and said neighboring one of said stationary passage, said means being operative for increasing said distance between said one upwardly foldable transporting passage and said one adjacent stationary transporting passage.

4. A corn harvesting implement as defined in claim 1, wherein said means is operative for increasing said distance during the upward folding of said upwardly foldable transporting passages from said working position to said transporting position.

5. A corn harvesting implement as defined in claim 1, wherein said means is formed so that said part of said upwardly foldable transporting passage is displaceable from said working position to said transporting position outwardly and forwardly.

6. A corn harvesting implement as defined in claim 5, wherein said means is formed so that in addition to said part of said upwardly foldable transporting passage, also another upwardly foldable transporting passage is displaceable from said working position to said transporting position outwardly and forwardly.

7. A corn harvesting implement as defined in claim 1; and further comprising an auxiliary frame and also a carriage guide which extends inclinedly relative to said transporting direction and connects said auxiliary frame with said drawing-in trough, said part of said upwardly foldable transporting passage being supported on said auxiliary frame.

8. A corn harvesting implement as defined in claim 7, wherein another of said upwardly folding transporting passages is also supported on said auxiliary frame.

9. A corn harvesting implement as defined in claim 1; and further comprising an auxiliary frame and also a hinge rectangle which extends inclinedly relative to said transporting direction and connects said auxiliary frame with said drawing-in trough, said part of said upwardly foldable transporting passage being supported on said auxiliary frame.

10. A corn harvesting implement as defined in claim 9, wherein another of said upwardly folding transporting passages is also supported on said auxiliary frame.

11. A corn harvesting implement as defined in claim 7, wherein said part of said upwardly foldable transporting passage is turnable relative to said carriage guide about an axis.

12. A corn harvesting implement as defined in claim 11, wherein said another upwardly foldable transporting passage is also turnable relative to said carriage guide about said axis.

13. A corn harvesting implement as defined in claim 7, wherein said part of said upwardly foldable transporting passage is turnable relative to said hinge rectangle about an axis.

14. A corn harvesting implement as defined in claim 13, wherein said another upwardly foldable transporting passage is also turnable relative to said hinge rectangle about said axis.

15. A corn harvesting implement as defined in claim 7, wherein said drawing-in trough has a part, said auxiliary frame being lockable and unlockable relative to said part of said drawing-in trough automatically during turning from said working position to said transporting position and reverse turning to said working position, respectively.

16. A corn harvesting implement as defined in claim 7, wherein said auxiliary frame is displaceable relative to said drawing-in trough and turnable to said transporting position and to said working position; and further comprising means for displacing and turning said auxiliary frame.

17. A corn harvesting implement as defined in claim 16, wherein said means for displacing and turning said auxiliary frame includes a hydraulic control member.

18. A corn harvesting implement for a field chopping machine, comprising a drawing-in trough; transporting passages located near one another in a working position and supported on said drawing-in trough, said drawing-in trough having two end sides; said transporting passages having two outer transporting passages located at said two end sides of said drawing-in trough respectively and upwardly turnable about respective axes and also fixable, said transporting passages include more than six said transporting passages, said transporting passages also having an additional outer transporting passage which is located at at least one of said side of said drawing-in trough and is also upwardly turnable about an axis and fixable, so that at said one end of said drawing-in trough two said outer transporting passages, including one first mentioned outer transporting passage and said one further transporting passage, are upwardly turnable about respective axes and also fixable.

19. A corn harvesting implement as defined in claim 18; and further comprising a main frame and two auxiliary frames each located at a respective one of said end sides of said drawing-in trough and upwardly turnable relative to said main frame, one of said auxiliary frames supporting said one first mentioned outer transporting passage and said further transporting passage at said one end side of said drawing-in trough and being upwardly turnable together with them and also fixable.

* * * * *